Aug. 3, 1965 J. RABINOW ETAL 3,199,080

LINE READING MACHINE

Filed Feb. 21, 1961 2 Sheets-Sheet 1

INVENTORS
JACOB RABINOW
WILLIAM FISCHER
BY Joseph A. Genovese &
Max L. Libman
ATTORNEYS INVENTORS
JACOB RABINOW
WILLIAM FISCHER
BY Joseph A. Genovese &
Max L. Libman
ATTORNEYS

United States Patent Office 3,199,080
Patented Aug. 3, 1965

3,199,080
LINE READING MACHINE

Jacob Rabinow, Takoma Park, and William Fischer, Silver Spring, Md., assignors, by mesne assignments, to Control Data Corporation, Minneapolis, Minn., a corporation of Minnesota Filed Feb. 21, 1961, Ser. No. 90,724
10 Claims. (Cl. 340—146.3)

This invention relates to reading machines and particularly to systems for improving the performance of reading machines.

At the present stage of development of the art, there are a number of reading machines which identify printed characters by scanning the characters, and using the scan information to identify the characters. Occasionally printed letters, numerals, symbols, etc., touch, thereby making the task of character identity difficult if not impossible for an ordinary machine. In some types of font, dipthongs, as "ae," are intentionally printed together. Poor adjustment of a typewriter is an even more serious source of difficulty, because some characters touch and the identity of the touching characters is not known beforehand. In explanation, reading machines usually rely on the clear white space between characters to enable the machine to know where one character ends and the next begins. If the space does not exist, some machines will be capable of identifying the first character of the touching pair, but not the second.

An object of our invention is to provide a system which, when incorporated in a reading machine of most designs, will enable the machine to identify the first character of a touching pair as a result of scanning the first character of the pair, and also enable the machine to identify the second character of the touching pair as a result of scanning the second character of the same pair but in the opposite direction.

Another object of the invention is to provide means in a reading machine for scanning a single line of characters alternately in a first and a second direction thereby automatically checking all characters of the line.

It is easier for a reading machine to recognize the beginning of a character when the first scanned feature is substantial, e,g. the leading edge of a capital "F." The leading edge provides an easily recognized signal; whereas the same character scanned from right-to-left provides an initial signal which is not very pronounced. Other characters, for example a "3" and a lower case "a" are more favorably scanned from right-to-left. Therefore, our invention will reduce the number of machine rejects caused by failure of the machine to recognize the beginning of a character as such, due to the configuration of the character.

Reading machines which identify the characters of a line ordinarily scan the line in one direction. The second and subsequent lines of characters are scanned in the same direction. There is a good reason for scanning the successive lines in one direction, and it is that the temporary storage or memory and decision sections of a machine are usually designed to receive and process the scan information on the basis of successive scans starting and continuing in the same direction.

We have found that certain mechanical difficulties are encountered in scanning in a line in one direction, and then returning the scan head (or document) to the beginning of the second line, and scanning the second line in the same direction. Furthermore, a significant amount of time is required to move the scanner and/or document from the end of one line to the beginning of the next. The electronic circuits of a reading machine are considerably faster than the paper moving mechanisms. According to another aspect of our invention, we are able to virtually double the reading rate of the machine by scanning successive lines in alternate directions. In other words, the first line would be scanned in one direction, the next line in the opposite direction, the third line in the original direction, etc. Hence, there is no lost retrace time for the scan head and/or paper movement. Instead, the only time required is to index the head or paper to the next line, and actually, the index time is not lost because the recognition circuits of the machine can function while the document is being indexed.

A similarity of features of this invention is now apparent. On one hand we scan the characters of the same line in two directions successively, and on the other hand we scan successive lines in opposite directions. The temporary storage for the scan information is very easily made to accept the information when gathered in the forward or the rearward scanning directions when the machine memory and gating system is the same or similar to that disclosed in Patent No. 3,104,369. This is more fully discussed subsequently as the description proceeds.

Other objects and features of importance, such as the many optional modes of operation to fulfill specific uses of reading machines, will become apparent in following the description of the illustrated forms of the invention.

FIGURE 1 is a diagrammatic plan view showing a portion of a document with the scan directions of several lines identified.

FIGURE 1*a* is a diagrammatic view similar to FIGURE 1 but showing a different scan pattern.

FIGURES 1*b* and 1*c* are schematic views showing a scan pattern for forward and rearward examinations of one character.

Figure 3:
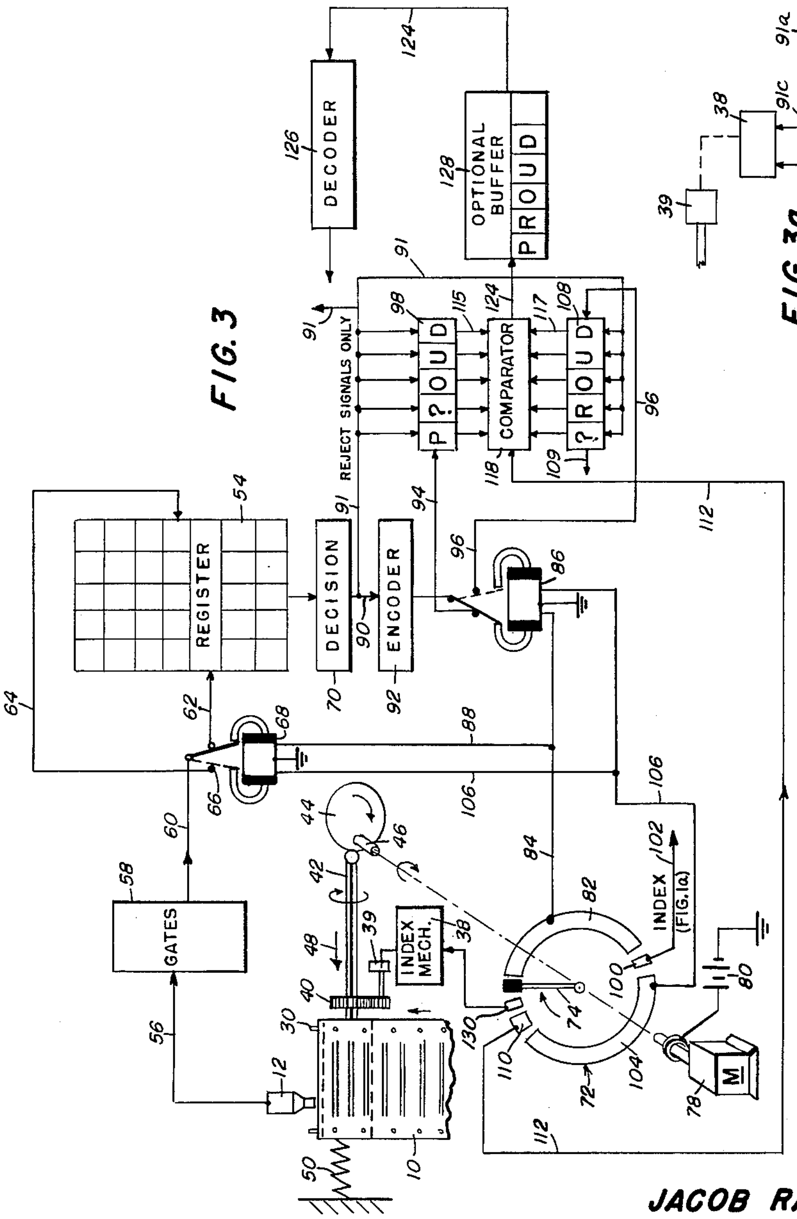
FIGURE 3 is a partially elevational view and a partial schematic diagram, to further illustrate a method of obtaining the scan motion, and to show the logic of one system by which to practice our invention.
Figure 3A:
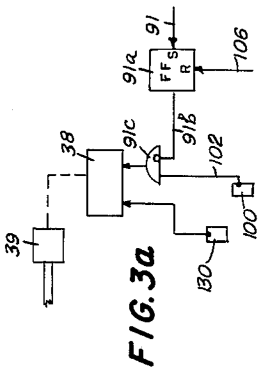

FIGURE 3*a* is a fragmentary view showing a modification where a line is scanned a second time only if there has been a reject in the reading of the line when scanned in one direction.

Figures 1, 1A, 1B, 1C, 2:
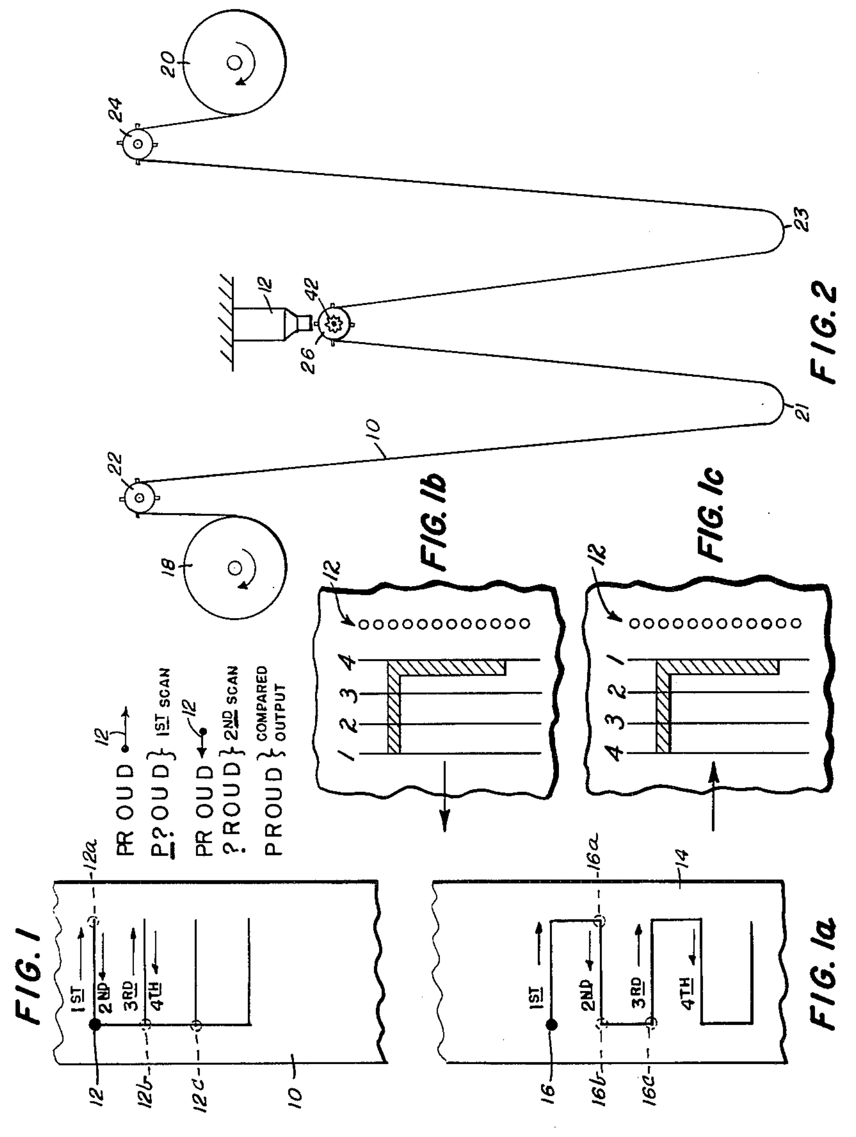
FIGURE 2 is a diagrammatic elevational view showing one method of obtaining the necessary scan motions.

FIGURES 1 and 1*a* show two scan patterns representing two different modes of operation of our invention. Document 10 in FIGURE 1 is assumed to have approximately horizontal lines of printed characters, for example typewritten lines. The spot 12 represents the scanner with the act of scanning beginning at the left end of the first line. Actually, this scanning is not done by a single element, but by a row of vertically spaced elements covering the vertical height of the character as shown in Patent No. 3,104,369, while the scanning pattern is shown in FIGURES 1*b* and 1*c* herein. The specific kind of scanner selected (row of photocells, flying spot, etc.) is inconsequential. Regardless of the type of scanner selected, it or its scan element or elements may be moved to the right or as we shall later show, remain stationary and the document moved with respect to the scanner. In either case, scanning is in one direction to the end of the first line (position 12*a*). The line is again scanned but in the opposite direction until the original position of spot 12 is again achieved. The next step is to index either the scanner or the document to the beginning of the second line, position 12*b*. The second line is scanned in one direction and then the other; then the document indexed to position 12*c*. This process is repeated until all lines of print on the document are scanned.

We realize two advantages by this scan procedure. One is that all characters of each line may be checked, and the second important advantage is that we are able to identify touching characters which would otherwise be rejected by a reading machine. For example, FIGURE 1 shows the word "proud" with the letters "pr" touching. During the first scan the reading machine is capable of identifying the letters "p?oud." The reason is that the recognition circuit of the machine will receive all of the necessary scan information for the letter "p" on which to make a proper decision. However, since there is no clear white space between the letters "p" and "r," the machine will not know that the "r" is a separate character and will reject the "r" as unworkable. The question mark in FIGURE 1 represents the rejection resulting from a reject signal from the reading machine. During the second scan which is in the opposite direction, the letters "?roud" will be identified. By comparing the results of the two scans, a decision can be made regarding the letters "p" and "r," as will be shown below.

Now consider FIGURE 1*a* which shows document 14 having essentially parallel lines of characters. The first line is scanned by scanner 16 in one direction as indicated. Then the scan head or document is indexed to the second line with the scanner at position 16*a* relative to the document. This is the end of the second line, and the scan direction toward the beginning of the line is indicated by the arrow. When position 16*b* is obtained, the document again indexes to the beginning of the third line, position 16*c*, and the third line is scanned from the beginning to the end thereof. This process is repeated until the data of all lines of the document are scanned and identified. Although this mode of operating our invention will not solve the problem of identifying touching characters, the speed of the machine is greatly increased since we have eliminated scan-retrace time, and this process is therefore useful where letter-touching is not a problem.

FIGURE 2 and a part of FIGURE 3 diagrammatically disclose one way of obtaining the necessary scan motions. The document 10 of FIGURE 1 (or 14 of FIGURE 1*a*) is shown as a strip but it is well known in the art that the document may be a card, a sheet or any other article having a surface on which characters are formed by any method. We show two reels 18 and 20 with one reel being the feed reel and the other being the take-up. The strip travels over rollers 22 and 24 and is looped at 21 and 23 to provide slack in the strip. It is also looped over index roller 26 disposed between the loops. The index roller is attached to splined shaft 42 capable of being reciprocated as well as indexed.

Strip 10 is indexed by a conventional index mechanism 38 (FIGURE 3) which drives splined shaft 42 through gearing 40, a ratchet or the like. Shaft 42 may slide longitudinally through a splined opening in one of the gears, but it is incapable of rotating with respect to the index drive gear. Any conventional means may be used to reciprocate shaft 42 and roller 26 attached to it, for example cam 44 secured to a motor operated shaft 46. The cam may bear against an end of shaft 42 or a cam follower at the end of the shaft. As the cam rotates, the shaft 42 and roller 26 are required to move in the direction of the arrow 48 (FIGURE 3) against the yielding opposition of spring 50. The spring furnishes force for return movement of the shaft and roller.

U.S. Patent No. 3,104,369 discloses a reading machine used herein to facilitate explanation of the principles of our invention. This patent describes a memory 54 composed of columns and rows of bistable devices, e.g. flip flops, and these are set by columns in accordance with the scan information gated into the memory. Therefore, we have shown scanner 12 connected by line 56 to gates 58 whose function is to gate the scan information into the memory 54 in phase with the scan movement (arrow 48). The memory disclosed in the above patent may be loaded from left-to-right or right-to-left with equal facility. Our present invention takes advantage of this as a matter of economy, although we, of course, may use separate memories.

Our present reading system is described below first in connection with FIGURE 1. When the first line is scanned in the first direction, the scan information from gates 58 on line 60 is fed to memory 54 by way of line 62. This loads the memory from left-to-right. However, during the second scan of the same line the scan information on line 60 is fed to memory 54 by way if line 64 whereby the memory is loaded in the opposite direction, i.e. from right-to-left. Switch section 66 of relay 68 routes the scan information into memory 54 over line 62 or 64.

The decision section 70 of the reading machine is known in the prior art, for instance it may be an absolute decision section as found in a number of prior patents or a best of match decision such as disclosed in U.S. Patent Nos. 2,901,246 or 3,104,369. As disclosed in the last-mentioned patent, if the reading machine is incapable of safely identifying a character, the machine provides a reject signal, previously represented herein as a question mark (?).

Switch 72 is a main control switch for timing the operation of the various components of our present invention. The switch is shown diagrammatically, it being clearly understood that electronic switching using logical elements is equivalent.

Moving contact 74 of switch 72 is driven by shaft 46 attached to motor 78. This is the same shaft which provides for scan motion, hence the scan motion and switch 72 are phased. Signal source 80, for instance, a battery, is connected to shaft 46 so that the movable contact 74 applies a voltage to the fixed contacts of the switch during the operation of motor 78. Fixed contact 82 has a line 84 to energize the polarized relay 86. Line 88 attached to line 84, energizes polarized relay 68. Therefore when movable contact 74 engages fixed contact 82 the scan information on line 62 will be fed into memory 54 by way of line 62. The decision section 70 feeds its output over line 90 to an encoder 92. Therefore, the characters identified are encoded, e.g. into a binary code, and the coded decisions regarding the characters are conducted on lines 94 or 96 depending on the position of relay 86. In the illustrated position, the encoded information is carried over line 94 to a temporary storage 98 which may be a magnetic tape buffer, a shift register buffer, etc.

Returning now to switch 72, as movable contact 74 touches fixed contact 100 a signal from source 80 is provided on line 102 and it is used in connection with the mode shown in 1*a*. For the mode shown in FIGURE 1 this signal is not used. Continuing with the movement of contact 74, the fixed contact 104 is reached next. Conductor 106 is attached to contact 104, and its signal operates relays 86 and 68. Switch section 66 of relay 68 directs the scan information on line 60 over line 64 into memory 54 from right-to-left. Relay 86 in its new setting, directs the encoded information over line 96 to the buffer 108 which is companion to buffer 98. However, the buffer 108 is loaded from one end whereas the buffer 98 is loaded from the other end to facilitate comparison of the data in the buffers.

When movable contact 74 touches fixed contact 110 a comparator trigger signal is conducted from source 80 on line 112 to a comparator 118 whose specific construction forms no part of our invention. The function of the comparator is to interrogate the buffers 98 and 108, and read out the character information stored therein. Comparator 118 may be constructed primarily of a network of OR gate circuits connected by lines 115 and 117 to the stages of buffers 98 and 108. The first stage of each buffer is compared, and the OR gate circuit for the first stages will see the letter "p" and a reject represented as a question mark (?), and select the "p" because it is a character and the question mark is merely a symbol that will be rejected by the comparator. The OR gates for the second stage and all other stages function in the same way. If two different characters are in corresponding stages of the buffers, the comparator will reject both characters. The comparator can be easily made to do this by logical AND gating between buffer stages with the gates requiring identical inputs. The output line 124 of comparator 118 conducts character-identity information which is decoded at 126. An optional storage buffer 128 is interposed in line 124 enabling the reading machine to be more easily used off-line in a computer system. For on-line use, line 124 may be fed directly to a computer if the encoding is in the computer code. Otherwise the output data of the comparator must be decoded and then coded into computer language.

When the movable contact 74 engages fixed contact 130 a signal from source 80 is applied to the index mechanism 38 in order to index the document 10 to the second line of characters.

The preceding describes one mode of operation from which many variations may evolve. For instance, in those cases where a high degree of security is required (accounting, reading negotiable instruments, etc.) a charactor can be rejected if it is rejected in one scan-direction reading or if it is read as one character in one direction and another in the opposite direction. In such cases the comparator 118 would have AND gates requiring identical inputs between corresponding buffer stages. Also, a reject signal appearing on line 91 and fed to the proper stage of buffers 98 and 108, could be used to inhibit the character.

Another variation is to require the second scan of a line only when there is a character rejection in reading the line for the first time. Such operation has all of the advantages of the mode pictorially represented in FIGURE 1 and none of the inherent time losses in scanning the same line twice. Each machine identity of a character which has been rejected as a result of the first scan, represents a higher level of performance of the machine.

The above operation is quite easily achieved. The normal operation will entail reading the lines in one direction only. Thus, line 102 will be connected to index mechanism 38 so that contact 74 will provide a signal to index the document after a single scan of a line. However, if there is a reject signal during the reading of the line, the reject signal is used to temporarily disable the index mechanism, or negate the signal on line 102 (FIGURE 3*a*), or simply open clutch 39 in the drive line between mechanism 38 and gearing 40. Of course, a memory will be required, e.g. a latching relay, flip flop, etc., which is set by the reject signal and released (reset in the case of a flip flop) by the signal on line 106. FIGURE 3*a* shows flip flop 91*a* set by a reject signal on line 91, and reset by a signal on line 106. The output of the flip flop on line 91*b* provides an inhibit signal for negated AND gate 91*c* interposed in line 102. Thus, the index signal on line 102 cannot pass gate 91*c* if there has been a "reject" in the line.

Considering now the mode shown in FIGURE 1*a*, some of the above described elements of the system are unnecessary. These are buffer 98 and comparator 118 since we do not compare the characters of a line. The retention of buffer 108 is merely to orient the encoded outputs of the odd lines (scanned right-to-left) with the even (scanned left-to-right). As contact 74 moves from the position shown, to engage contact 82, relays 68 and 86 are actuated to the illustrated position. Meanwhile document 10 is moved to the left (FIGURE 3) because cam 44 is attached to the same shaft as contact 74. During the scan of the first line, the scan information is conducted over lines 60, 62 into memory 54. The decisions for each character are available at line 90, or they may be encoded at 92 and fed over line 94 directly to a utilization device. At the completion of the first line, contact 100 of switch 72 is engaged by movable contact 74 thereby conducting a signal on line 102 which operates index mechanism 38 so that the document now appears at position 16*a* (FIGURE 1*a*) relative to the scanner. Further movement of contact 74 causes it to engage contact 104 thereby operating relays 68 and 86 to the dotted line positions by a signal on line 106. Now the scan information is conducted to memory 54 by way of lines 60 and 64. Since the scanning is in the opposite direction (from position 16*a* to position 16*b* of FIGURE 1*a*) and the memory is loaded in the opposite direction (over line 64), the information for the individual characters appearing in the memory will be oriented the same for each scan. However, the character decisions will be in the order of line scanning, e.g. the word "proud" will be "d-u-o-r-p" when scanned right-to-left. Therefore we use buffer 108 to remember the characters of the line, after which they are read out in reverse order from acceptance, e.g. serially on line 109. In this form of our system we can use the signal on line 112 as a serial readout trigger for buffer 108.

We have shown buffers 98 and 108 containing a single word on the assumption that the line of print being discussed contains only this word. Obviously, buffers 98 and 108 may be of any capacity. In the mode of FIGURE 1, the comparison between buffers may be on a character-for-character, or word-for-word, or line-for-line basis. These variations and all others falling within the scope of the following claimss may be resorted to.

We claim:

1. In a reading machine for lines of characters, means for scanning a first line in a first direction and for scanning the same line in the opposite direction, decision means responsive to the scan outputs for identifying the characters that are scanned, means to remember the characters identified for each scan of the line, and means including a comparator for comparing the remembered characters for the first and second-mentioned scan to provide character identifying signals that includes any characters recognized for one scan but not the other.

2. The reading machine of claim 1 wherein said first line has a pair of characters which touch so that during the first scan the first character of the pair is identified by said decision means and the second may not be identified, but during the scan in the opposite direction the second character of said pair is identified and the first may not be identified, and means operated at the completion of said scan of the line in the opposite direction for actuating said comparator to effect the comparing of said remembered characters.

3. In a reading machine for approximately parallel lines of characters, means for scanning a first line in one direction, a memory, means responsive to the scan outputs for gating the scan information into said memory in one direction, means for requiring the same said scanning means to scan a second line in the opposite direction thereby eliminating scan retrace time, and means operative during the scan of the second line for gating the scan information into said memory in the opposite direction.

4. In a reading machine for approximately parallel lines of characters, means for scanning a first line in one direction and providing character information outputs during the scan, means responsive to said outputs for providing character identifying signals for the characters of the line, means to encode said signals, a memory device for the encoded signals, means to cause said scanning means to scan the first line a second time but in the opposite direction to provide second information outputs, means responsive to the second outputs for providing character identifying signals for the characters of said line, said last-mentioned signals being encoded by said encode means, a second memory device for the last-mentioned encoded signals, and means to compare the stored information in said memory devices and provide new signals identifying the characters of said line on the basis of said first and said second information outputs.

5. The reading machine of claim 4 wherein said means providing character identifying signals includes a temporary storage, and means to gate the information outputs into said temporary storage in one direction during the first scan of the line and for gating the information outputs into the temporary storage in the opposite direction during the second scan of the same line.

6. In a reading machine for lines of characters, said machine having a temporary store for individual characters, and a scanner, the improvement comprising means to produce scan motions for scanning the same line twice in opposite directions and for selectively scanning successive lines with one line scanned in one direction and the next line scanned in the opposite direction, means for gating the scanner outputs into said store in one direction during scanning in one direction and for gating the scanner outputs into said store in the opposite direction during scanning in the opposite direction so that the information received into the store regarding the characters is always oriented in one direction notwithstanding the direction in which the line is scanned.

7. In a reading machine, scan means for lines of characters, said scan means including means to normally scan a line in a first direction but also being capable of scanning the line in a second direction and to provide scan outputs during the scanning, recognition means resposive to the scan outputs to identify the characters and also to provide a reject signal for any character in the line which is not identified, and means responsive to the reject signal for requiring said scanning means to scan the line in said second direction when a reject signal occurs as a result of scanning said line in said first direction.

8. In a reading machine for lines of characters, scan means for the lines, recognition means responsive to the scan outputs to provide character-identity signals and reject signals for any unidentified characters, said scan means including means to scan a line in one direction, and means responsive to a reject signal to require said scan means to scan the line containing the character which gave rise to said reject signal, in the opposite direction.

9. In a reading machine for characters arranged in a line where there is no machine-detectable clear space between a pair of the characters of the line and the machine relies upon said clear space to determine the beginning of a character, scan means to scan the line in one direction and also to scan the line in the opposite direction, said scan means providing scan outputs for the characters of the line as the line is scanned in both directions, decision means responsive to said outputs to identify the characters of the line, said decision means providing a character-identity output for one character of said pair as a result of the scan in one direction and providing a character-identity output for the other character of said pair as a result of the scan in the opposite direction.

10. In a character reading machine having a decision section and means to provide a reject signal when the decision section fails to recognize an unknown character with a predetermined certainty; scanning means to scan a group of characters in one direction and provide scan information outputs pertaining to the characters, means to conduct said outputs to said decision section which identifies each character by means of character-identity signals or provides for a reject signal, storage means for each character identity signal including any reject signals, said group of characters being again scanned but in the opposite direction, and said decision section providing a second group of character-identity signals or reject signals, storage means for said second group of character-identity signals, and comparison means responsive to the stored signals in both of said storage means to provide new character-identity signals corresponding to the characters of said group.

References Cited by the Examiner

UNITED STATES PATENTS

| | | | |
|---|---|---|---|
| 2,919,426 | 12/59 | Rohland | 340—149 |
| 2,932,006 | 4/60 | Glauberman | 340—149 |

FOREIGN PATENTS

| | | |
|---|---|---|
| 820,283 | 6/57 | Great Britain. |

MALCOLM A. MORRISON, *Primary Examiner.*

NEIL C. READ, *Examiner.*